United States Patent
Rifel et al.

(10) Patent No.: US 9,346,387 B2
(45) Date of Patent: May 24, 2016

(54) CUP HOLDER AND STORAGE BIN ASSEMBLY

(71) Applicant: Ford Global Technologies, LLC, Dearborn, MI (US)

(72) Inventors: Eric Rifel, Huntington Woods, MI (US); Scott Simon, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 13/916,875

(22) Filed: Jun. 13, 2013

(65) Prior Publication Data

US 2014/0367433 A1    Dec. 18, 2014

(51) Int. Cl.
B60R 7/00 (2006.01)
B60N 3/10 (2006.01)

(52) U.S. Cl.
CPC  B60N 3/105 (2013.01); B60N 3/10 (2013.01); B60N 3/103 (2013.01)

(58) Field of Classification Search
CPC ........... B60N 3/105; B60N 3/10; B60N 3/103
USPC ............... 224/544, 281, 926; 248/311.2, 312, 248/312.1, 314; 296/37.1, 37.8; 220/237, 220/529, 532, 533, 544
See application file for complete search history.

(56) References Cited

U.S. PATENT DOCUMENTS

| | | | |
|---|---|---|---|
| 5,014,956 A | 5/1991 | Kayali | |
| 5,634,621 A | 6/1997 | Jankovic | |
| 6,682,116 B1 * | 1/2004 | Okumura | B60N 2/4606 224/275 |
| 6,866,319 B2 * | 3/2005 | Hupfer | B60R 7/04 224/282 |
| 7,226,029 B2 * | 6/2007 | Hoshi | B60N 3/105 224/282 |
| 2005/0224509 A1 * | 10/2005 | Dry | B60N 3/107 220/849 |
| 2009/0224124 A1 * | 9/2009 | Kniazyszcze | B60N 3/106 248/311.2 |
| 2011/0297717 A1 * | 12/2011 | Kaemmer | B60N 3/108 224/567 |
| 2013/0105536 A1 * | 5/2013 | Simon | B60N 3/102 224/567 |

FOREIGN PATENT DOCUMENTS

JP    2012025184    2/2012
KR    20050031813   4/2005

OTHER PUBLICATIONS

Nick Magnuski et al., Driver's Dream Cup Holder, pp. 1-77.

* cited by examiner

*Primary Examiner* — Justin Larson
*Assistant Examiner* — Lester L Vanterpool
(74) *Attorney, Agent, or Firm* — Vichit Chea; Price Heneveld LLP

(57) ABSTRACT

A cup holder assembly includes a housing having a track member, wherein an insert, having first and second sides, is adjustably received on the track member in a vertical manner. The insert is adapted to be positioned within the housing in either an upright or inverted position. The insert thereby provides first and second storage configurations relative to the upright and inverted configuration of the insert within the housing.

18 Claims, 9 Drawing Sheets

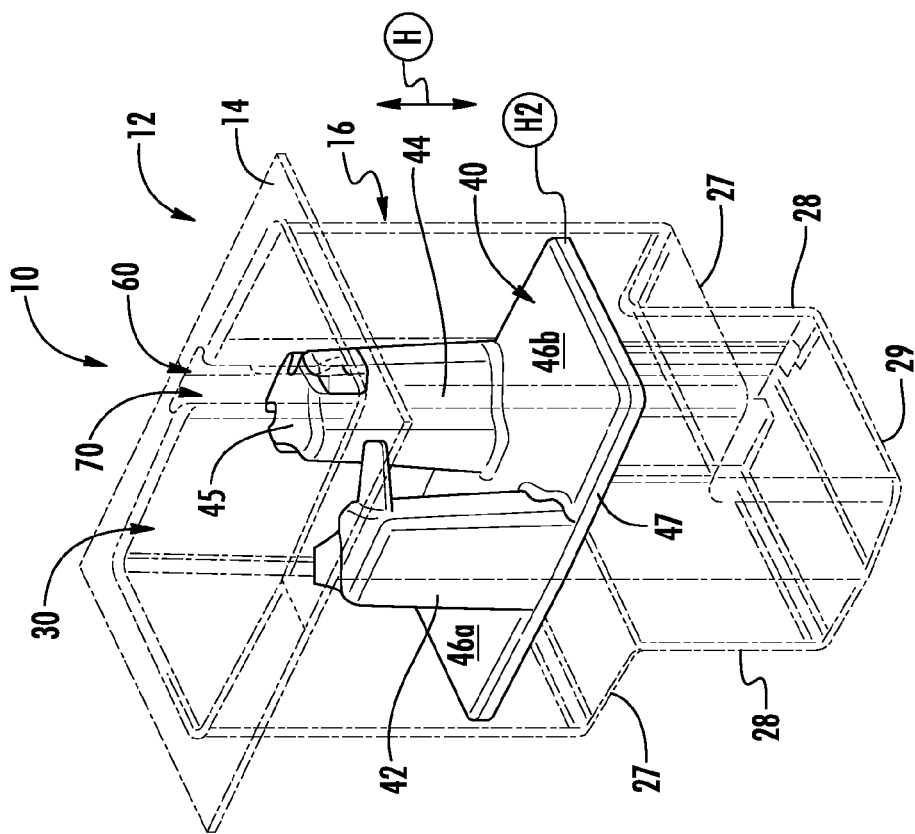
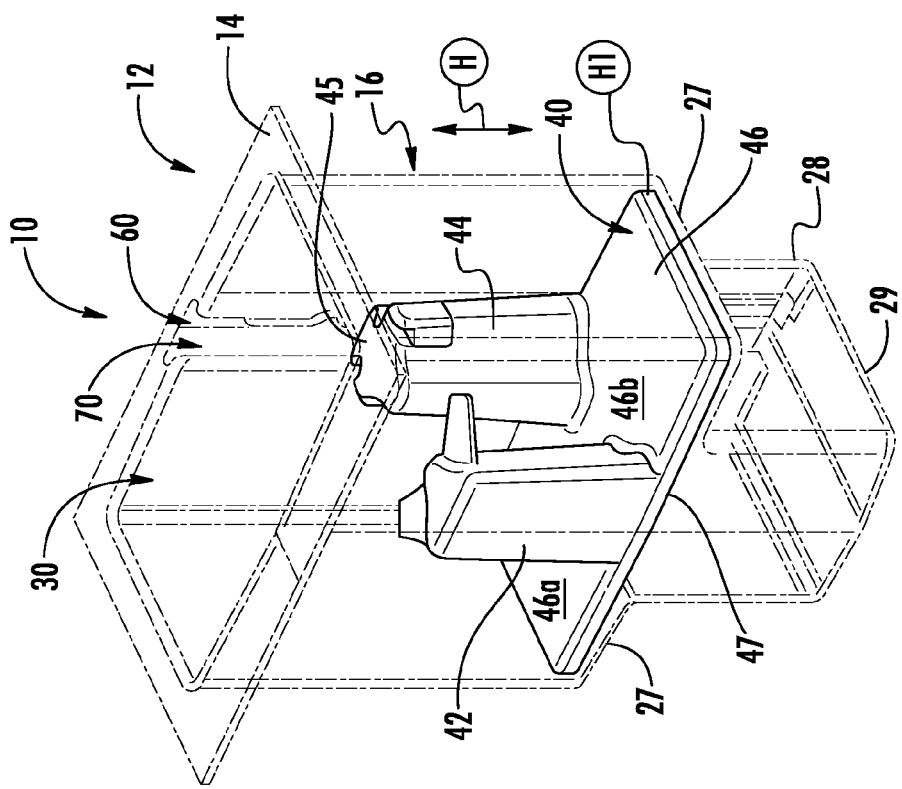

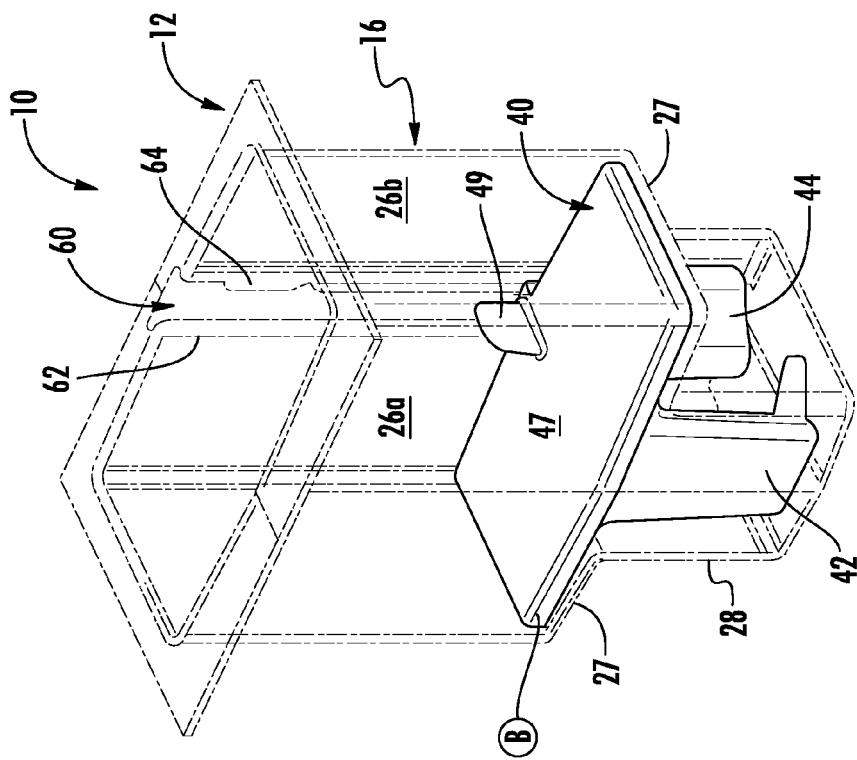
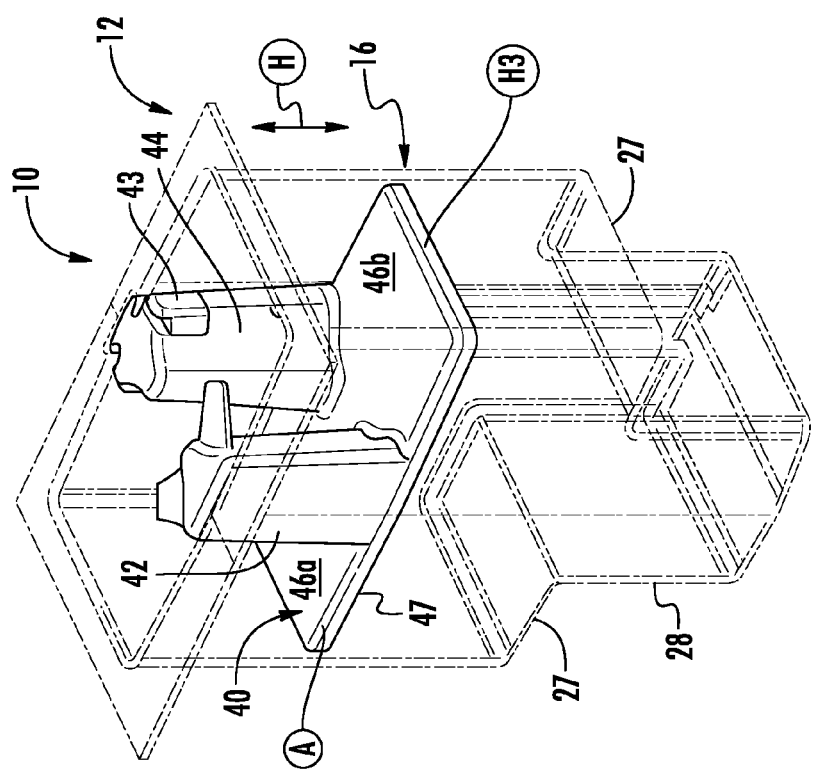

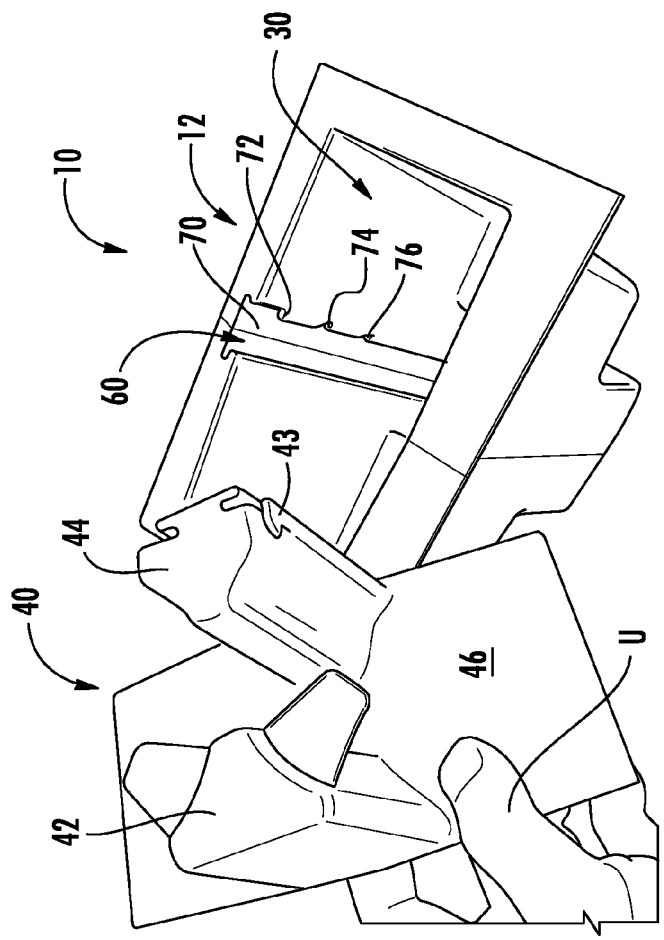
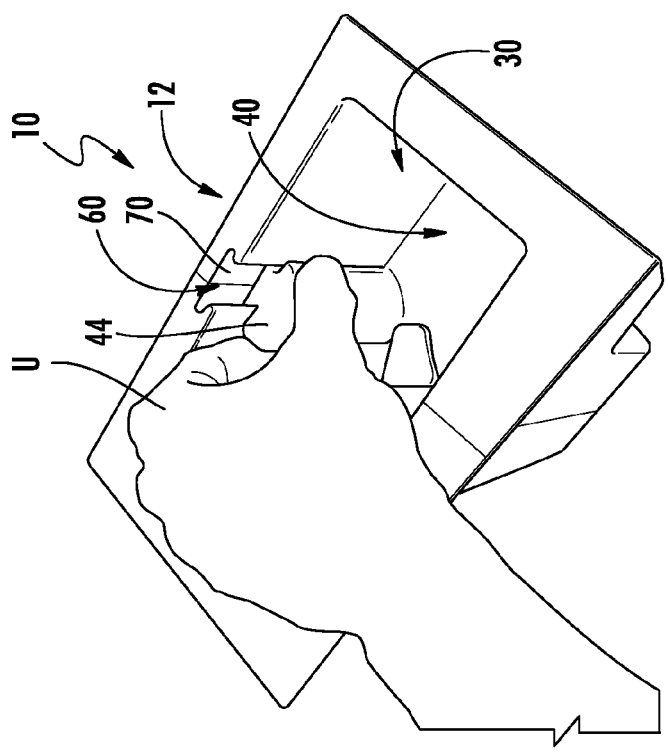
FIG. 5B
FIG. 5A

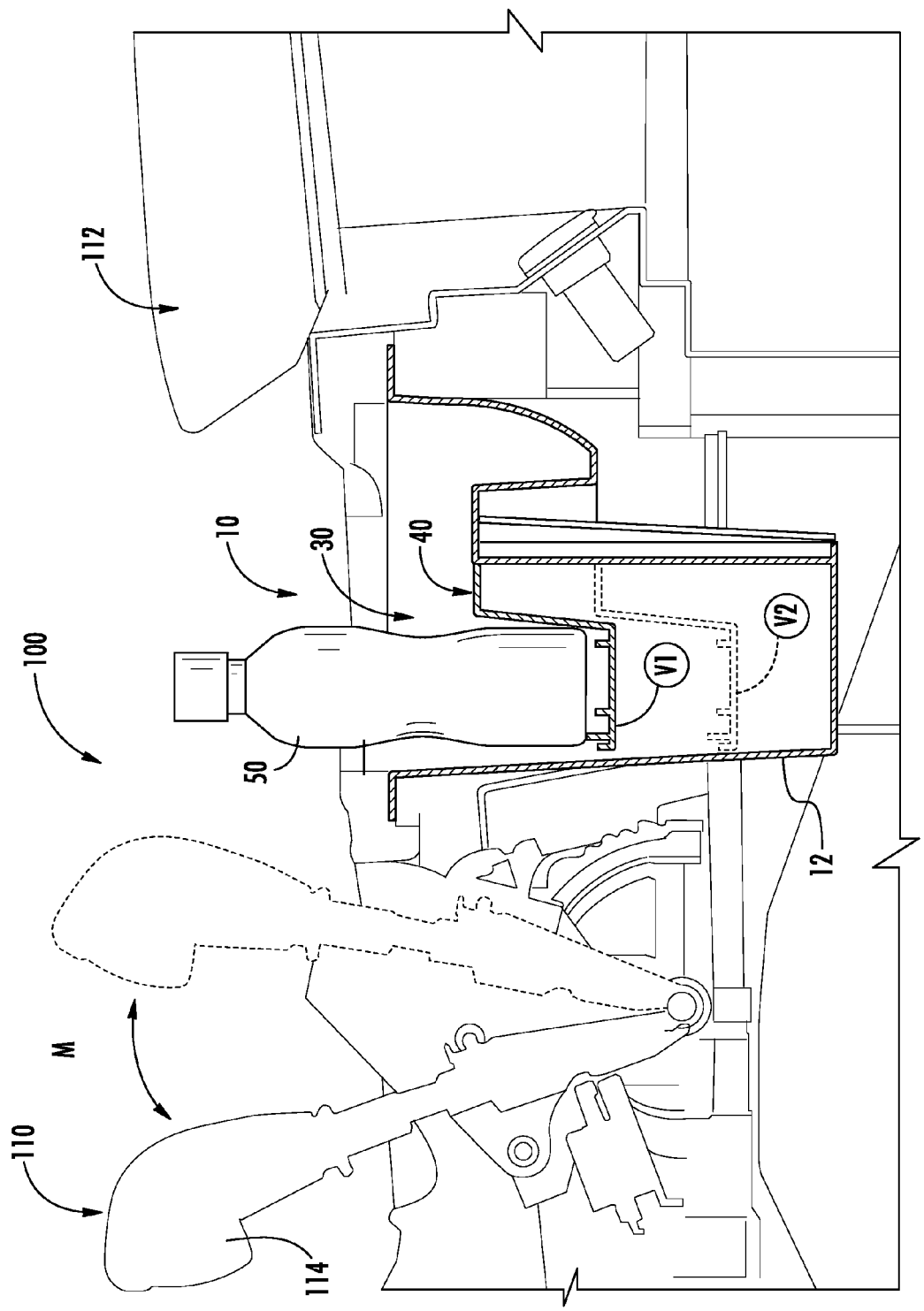

US 9,346,387 B2

CUP HOLDER AND STORAGE BIN ASSEMBLY

FIELD OF THE INVENTION

The present invention generally relates to a cup holder assembly for use in a console of a motor vehicle and, more specifically, to a cup holder assembly having an insert which is adjustably received in a housing at various depths, and further wherein the insert can be inverted within the housing to expose opposing first or second sides of the insert having varying functionality.

BACKGROUND OF THE INVENTION

Vehicles often have fixed cup holders disposed in the console for storing beverages and other items for the vehicle occupants. Storage space in a vehicle console is limited, and it is necessary to provide a variety of options for the vehicle occupants to tailor the cup holder assembly or storage bin to their needs.

The present invention provides a convertible cup holder assembly having a housing with a track member disposed therein, wherein the track member is adapted to adjustably support a convertible insert for providing a vehicle occupant with a variety of options for item and beverage storage.

SUMMARY OF THE INVENTION

One aspect of the present invention includes a cup holder assembly having a housing which defines a cavity. An insert, having a first side and a second side, is adapted to be adjustably received on a track member disposed within the housing. The insert is adapted to be received in the housing in a first orientation such that the first side of the insert defines a cup holder floor. The insert is further adapted to be received in the housing in a second orientation, wherein the second side defines a cup holder floor.

Another aspect of the present invention includes a cup holder assembly including a storage bin having a track member. An insert is adapted to be received on the track member within the storage bin between upright and inverted positions. The insert includes a first side having one or more storage features defining a first storage configuration when the insert is in the upright position. The insert further includes a second side which is exposed when the insert is in the inverted position, thereby defining a second storage configuration.

Yet another aspect of the present invention includes a cup holder assembly including a housing having a track member. An insert having first and second sides is adjustably received on the track member within the housing between first and second positions. The first side of the insert is upwardly facing when the insert is in the first position, thereby defining a first storage configuration. The second side of the insert is upwardly facing when the insert is in the second position, thereby defining a second storage configuration.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 3A-3C are perspective views of the cup holder assembly of FIG. 1 showing the housing in phantom with the insert assembly received therein in an upright position and supported at varying levels;

FIG. 3D is a perspective view of the cup holder assembly of FIGS. 3A-3C with the insert assembly in an inverted position;

FIG. 5A is a perspective view of a user adjusting an insert within a cup holder assembly;

FIG. 5B is a perspective view of a user removing the insert from the cup holder assembly;

FIG. 6 is a cross-sectional view of the cup holder assembly and insert as disposed in a vehicle console.

DETAILED DESCRIPTION OF THE PREFERRED EMBODIMENTS

Figure 1A:
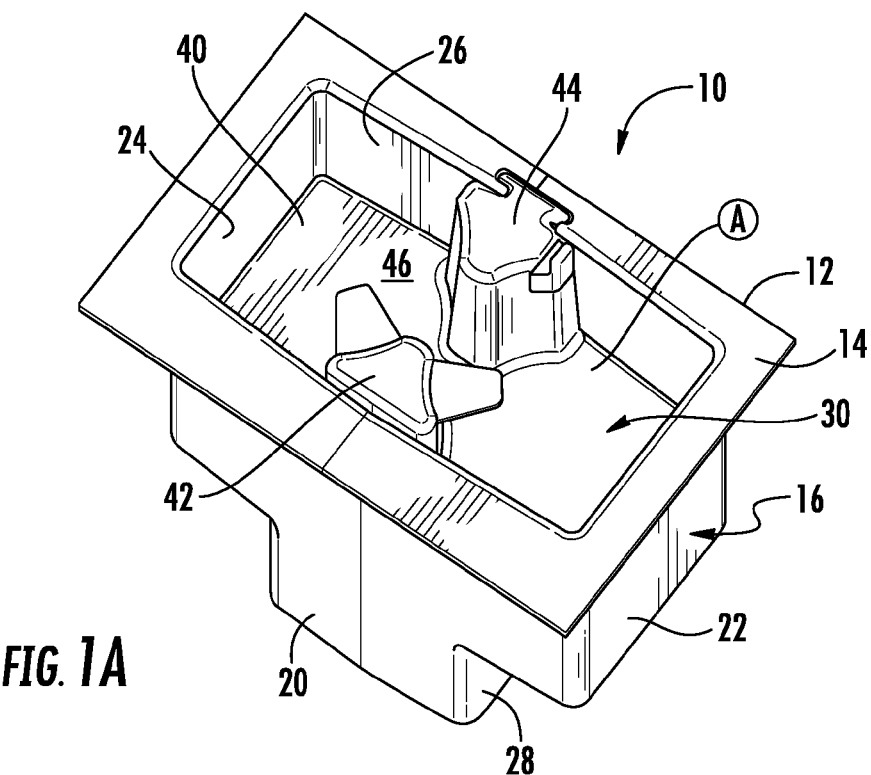
FIG. 1A is a perspective view of a cup holder assembly according to one embodiment of the present invention.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1A, the reference numeral 10 generally designates a cup holder assembly according to one embodiment of the present invention. The cup holder assembly 10 includes a housing 12 having an upper lip portion 14 and a storage bin 16. The storage bin 16 is defined by front wall 20, side walls 22, 24, and rear wall 26. In the embodiment shown in FIG. 1A, the storage bin 16 further includes a lower well 28. The front wall 20, side walls 22, 24 and rear wall 26 cooperate to define a cavity 30 in which an insert 40 is received. As shown in FIG. 1A, the insert 40 includes a car-forward beverage storage and alignment feature 42 and a car-rearward beverage storage and alignment feature 44. The beverage storage and alignment features 42, 44 extend upwardly from a first side 46 of the insert 40, such that the first side 46 defines a cup holder floor when the insert 40 is in a first or upright position A as shown in FIG. 1A. The beverage storage and alignment features 42, 44 include laterally extending retainment arms which are generally flexibly resilient arms that extend into the cup holder wells to retain a beverage container. It is contemplated that the beverage storage and alignment features 42, 44 may include other retainment features, such as molded-in bubbles adapted to frictionally engage and retain a beverage container.

Figure 1B:
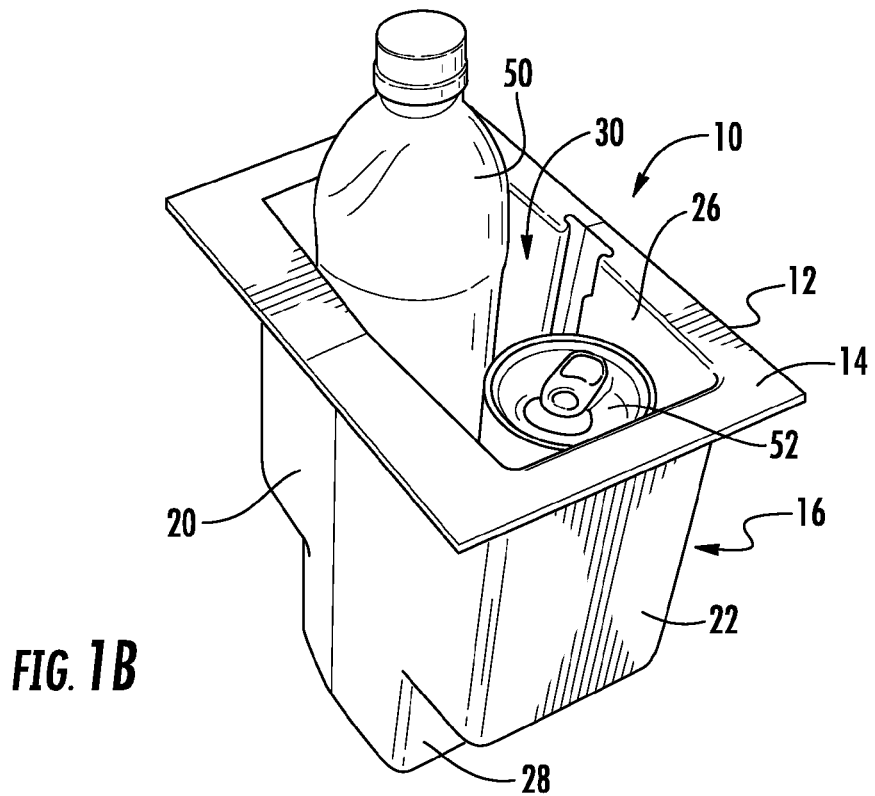
FIG. 1B is a perspective view of the cup holder assembly of FIG. 1A having multiple beverage containers disposed therein.

Referring now to FIG. 1B, the cup holder assembly 10 is shown having a beverage container 50, exemplified as a 1-Liter bottle, and a second beverage container 52, exemplified as a beverage can, stored within the cavity 30 of the cup holder assembly 10. While not shown in FIG. 1B, one of ordinary skill in the art will understand that the insert 40 has moved downward within the cavity 30 of the cup holder assembly 10 (relative to FIG. 1A) to support the beverage containers 50, 52 on the first side 46 of the insert 40. Thus, the insert 40, as shown in FIG. 1A, is adapted to move vertically within the cavity 30 of the cup holder assembly 10, such that the floor of the cavity, which in this case is defined by first side 46 of the insert 40, can be moved to an appropriate level to support variably sized beverage containers, such as beverage containers 50, 52 shown in FIG. 1B. The vertical adjustment of the insert 40 is further described below.

Figure 1C:
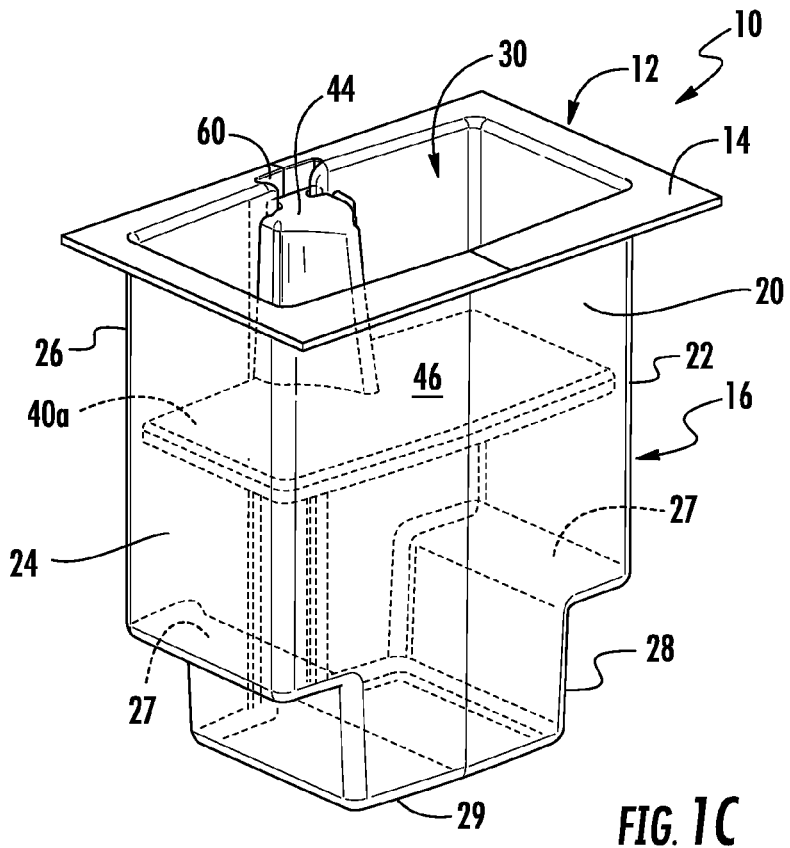
FIG. 1C is a perspective view of a cup holder assembly according to another embodiment of the present invention showing an adjustable insert in phantom.
Figure 1D:
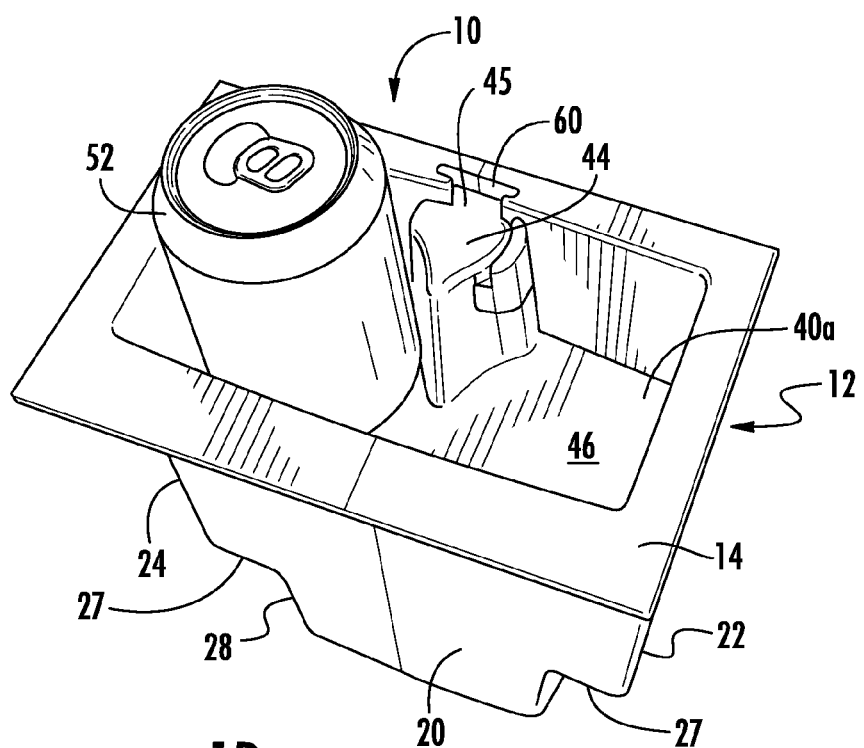
FIG. 1D is a perspective view of the cup holder assembly of FIG. 1C having a beverage container stored therein.

Referring now to FIGS. 1C and 1D, the cup holder assembly 10 is shown having an insert 40a, which differs from insert 40 shown in FIG. 1A as the beverage storage and alignment feature 42 is not present in the embodiment of the insert 40a shown in FIG. 1C. The beverage storage and alignment feature 44 is disposed in a car-rearward position on the first side 46 of the insert 40a, and includes a coupling portion 45 adapted to be received on a track member 60. The track member 60 which is disposed along a length of the rear wall 26 as best shown in phantom in FIG. 1C. As further shown in FIG. 1C, the lower or bottom well 28 is disposed directly below landing portions 27 which, as further described below, can be used to support the insert 40a in a downward-most position. The bottom well 28 further includes a bottom wall 29. As shown in FIG. 1D, beverage container 52 is stored and retained within the cavity 30 of the cup holder assembly 10, whereby beverage storage and alignment feature 44 has properly positioned the beverage container 52 on a specific side of the cavity portion 30. In this way, the storage and alignment feature 44 defines a first storage configuration when side 46 of the insert 40a is upwardly facing within the housing 12.

Figure 2A:
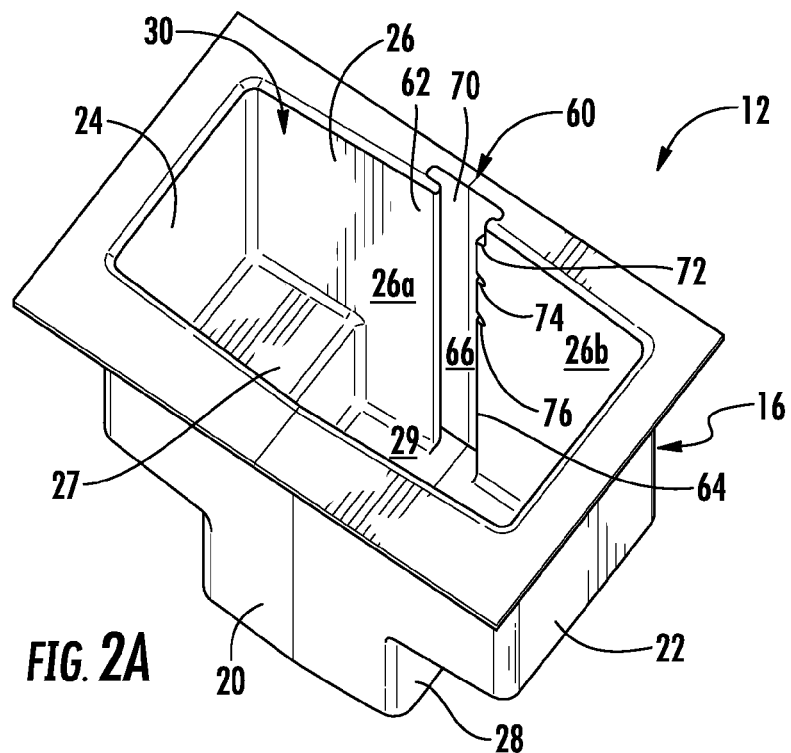
FIG. 2A is a perspective view of the cup holder assembly of FIG. 1A having the insert removed.
Figure 2B:
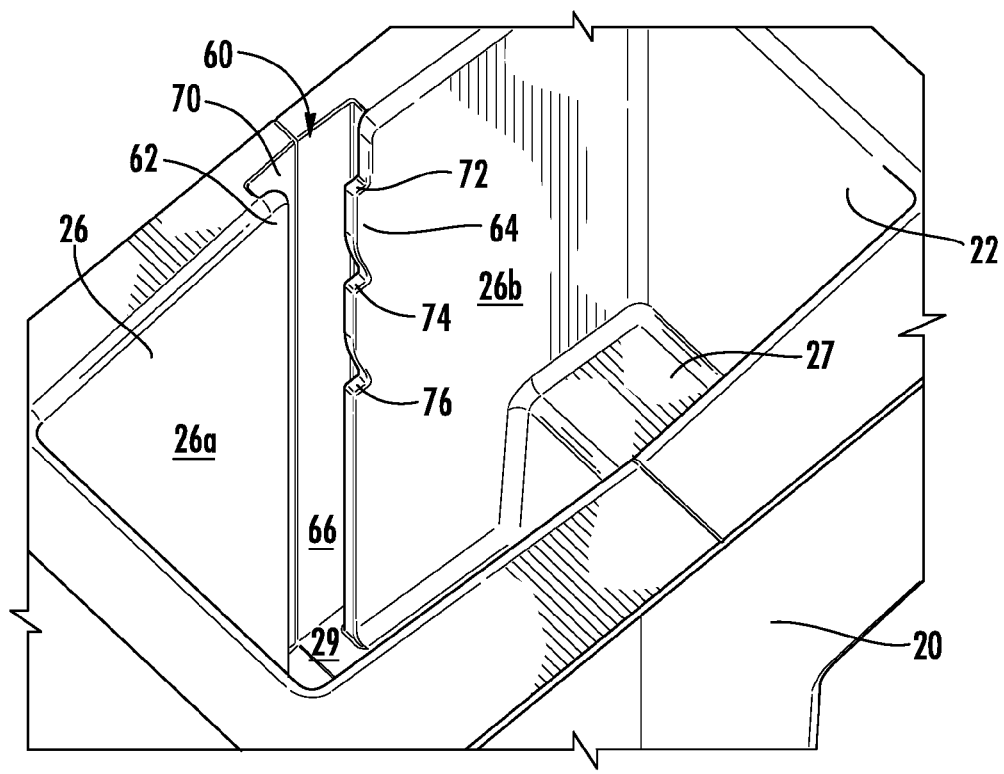
FIG. 2B is a fragmentary perspective view of a track member disposed within a housing of the cup holder assembly of FIG. 2A.

Referring now to FIGS. 2A and 2B, the cup holder housing 12 is shown without an insert. As shown in FIG. 2A, the track member 60 divides the rear wall 26 of the housing 12 between first and second portions 26a and 26b. In the embodiment shown in FIG. 2A, the track member 60 is centrally disposed along the rear wall 26. The rear wall portions 26a and 26b terminate in flange portions 62, 64 respectively which cooperate with a rear wall 66 of the track member 60 to define a channel 70. In assembly, the channel 70 of the track member 60 is adapted to receive the coupling portion of an insert for slidably supporting the insert along the track member 60 as further described below. As shown in FIGS. 2A and 2B, flange 64 of rear wall portion 26B includes a series of detents 72, 74 and 76 which are adapted to provide various height adjustment features for the insert as received in channel 70 of the track member 60. In this way, the cup holder assembly 10 of the present invention provides various floor heights for different beverage container sizes. In the embodiment shown in FIGS. 2A and 2B, detent 72 is used to support an insert at an upper-most vertical position, while detent 76 is adapted to support an insert at a downward-most vertical position. Detent 74 is adapted to provide a midway point for the insert that is between the floor height levels set by detents 72 and 76. Further, it is contemplated that the insert can be supported on landing portions 27 below detent 76 when the insert is slidably received within the channel 70 of the track member 60, but not engaged with a detent disposed on the flange portion 64 of rear wall portion 26b. Thus, the insert is adapted to be supported at a position lower than the lower most detent when supported by the landing portions 27 disposed within the cavity 30 of the housing 12. In the embodiment shown in FIGS. 2A and 2B, the detents 72, 74 and 76 are shown disposed on the flange portion 64 of rear wall portion 26b. However, it is contemplated that the detents can be located on either flange portion 62 or 64 of rear wall portions 26a and 26b, and it is further contemplated that any number of detents can be defined on either flange portion for providing multiple configurations of floor heights for the cup holder assembly 10.

Referring now to FIGS. 3A-3D, the cup holder assembly 10 is shown having the housing portion 12 in phantom such that insert 40 is clearly visible at varying heights. With specific reference to FIG. 3A, the insert 40 is disposed at a lower most vertical position $H_1$, wherein the insert 40 is supported on the landing portions 27 of the housing 12. As shown in FIG. 3A, the insert 40 includes first and second beverage storage and alignment features 42, 44 which essentially divide the first side 46 of the insert into storage areas 46a and 46b. In the embodiment shown in FIGS. 3A-3D, the beverage storage and alignment features 42, 44 are generally trapezoidal features which are adapted to accommodate a variety of beverage containers as supported on the first side 46 in either section 46a or 46b. As shown in FIG. 3A, a second side 47 of the insert 40 is disposed in opposition to first side 46 and abuts the landing areas 27 of the housing 12 such that the second side 47 of the insert 40 supports the insert 40 within the cavity portion 30 of the housing 12 at position $H_1$. In use, the insert 40 is adapted to slide vertically within the storage bin 16 of the housing 12 as the attachment feature 45 of the beverage storage and alignment feature 44 moves within the channel 70 of the track member 60. In this way, the insert 40 is adapted to move vertically along a path indicated by arrow H.

As the insert 40 moves from a position $H_1$, as shown in FIG. 3A, to a vertical position $H_2$, shown in FIG. 3B, the insert 40 moves upward along the track member 60 within the housing 12. As positioned at height level $H_2$ in FIG. 3B, it is contemplated that the insert 40 is engaged with a lower most detent, such as detent 76 shown in FIG. 2B. As shown in FIG. 3C, the insert 40 has been moved to an upper most position $H_3$, wherein it is contemplated that the insert 40 is engaged with detent 72 shown in FIG. 2B. Thus, as shown in FIGS. 3A-3C, the insert 40 is supported within the housing 12 at various vertical positions $H_1$, $H_2$ and $H_3$, as well as other vertical positions depending on the number of detents disposed along the track member 60 of the housing 12. The insert 40 moves along the track member 60 of the housing 12 by an engagement feature 45 disposed on the car-rearward beverage storage and alignment feature 44 which includes a notch release button 43 that is adapted to disengage the attachment feature 45 from the track member 60 as further described below.

The insert 40 can be completely removed from the housing 12 as shown in FIG. 2A, thereby making storage bin 16 fully accessible. Further, as shown in FIGS. 3A-3C, the insert 40 can be inserted into the housing 12 in an upright orientation such that first side 46 of the insert 40 faces upward. In the embodiment shown in FIGS. 3A-3C, the insert 40 includes two beverage storage and alignment features 42, 44 thereby defining a first orientation or storage configuration A which includes divided floor portions 46a and 46b. Referring now to FIG. 3D, the insert 40 can also be fully removed from the housing 12 and positioned in an inverted position within the housing 12, such that the second side 47 is upwardly facing.

With the underside or second side 47 upwardly facing, a second storage configuration B is defined. In the inverted position, the insert 40 has attachment portion 45 of beverage storage and alignment feature 44 received within the channel 70 of track member 60, however, the attachment portion 45 is not engaged with the notches disposed on the flange portion 64 of rear wall portion 26b. This is because the engagement feature and release button, such as release button 43 shown in FIG. 3C, are now disposed along the flange portion 62 of rear wall portion 26a which, in the embodiment shown in FIG. 3D, does not include any vertically spaced apart notches or detents. In the inverted position, the insert 40 has the beverage storage and alignment features 42, 44 received within the bottom well 28 of the housing 12. In this way, the first side 46 of the insert 40 abuts and is supported on the landing portions 27 of the housing 12. A tab or handle member 49 extends upwardly from the second side 47 of the insert 40 when in the inverted position, such that a user can grasp the handle member 49 and lift the insert 40 along the track member 60 to remove the insert 40 from the housing 12. In this way, the cup holder assembly 10 of the present invention provides first and second storage configurations A and B, as shown in FIGS. 3C and 3D, wherein the first storage configuration has the first side 46 exposed to the user and upwardly facing with a plurality of storage features 42, 44 disposed thereon. In the inverted position, a second storage configuration B is shown in FIG. 3D, wherein the second side 47 is exposed to the user and upwardly facing, such that the user is now provided with a more planar storage assembly for retaining any number of items in transport. The relative movement of the insert 40 between upright and inverted positions is described below with reference to FIGS. 5A-5D.

Figure 4:
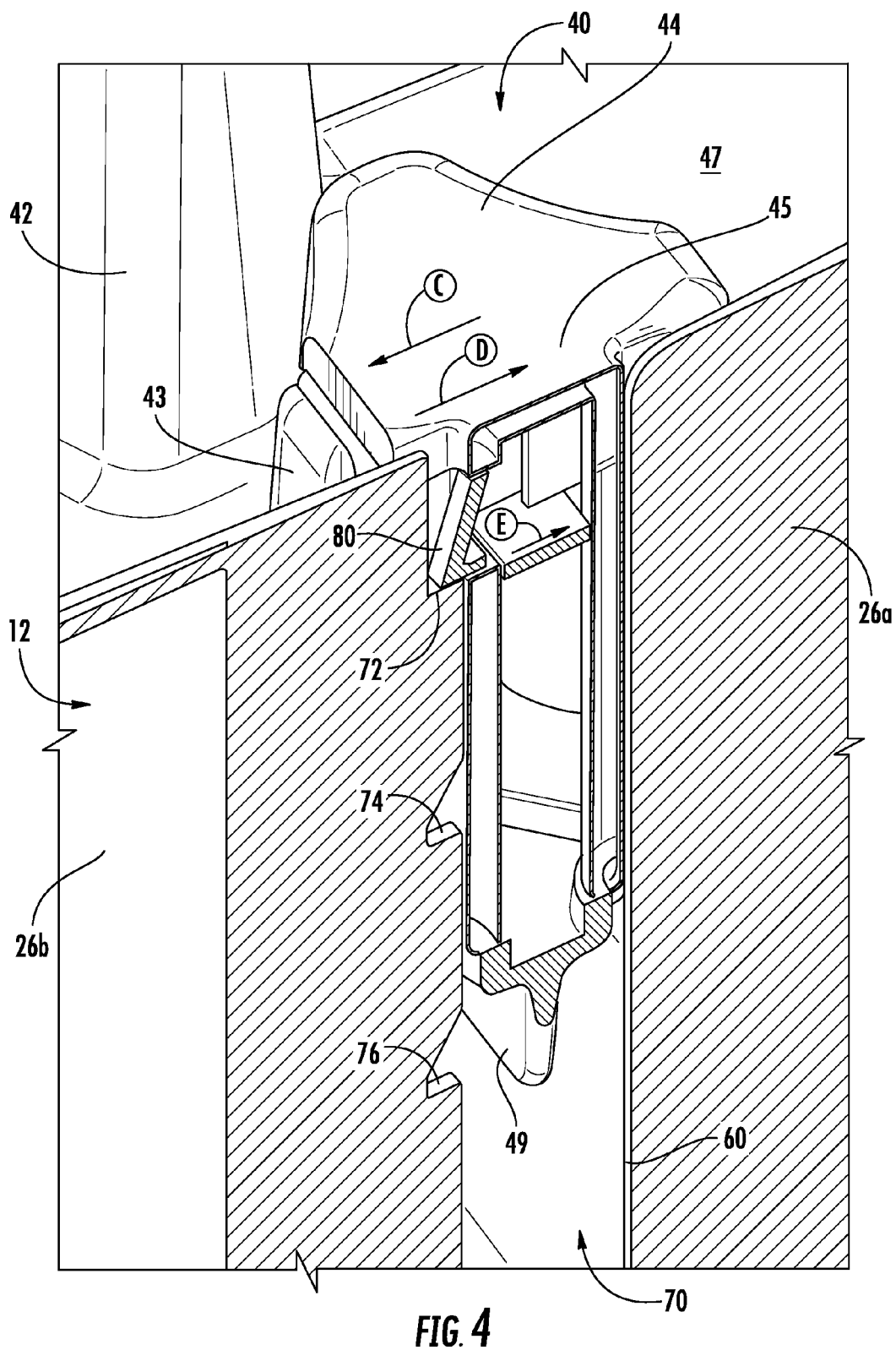
FIG. 4 is a fragmentary cross-sectional view of a cup holder assembly and insert as supported on a track member of the cup holder housing.

Referring now to FIG. 4, the insert 40 is shown in a cross-sectional view, such that attachment feature 45 of the beverage storage and alignment feature 44 is shown disposed within channel 70 of the track member 60. The attachment or coupling mechanism 45 includes a release button 43 which is adapted to release the attachment mechanism 45 from engagement with anyone of the notches 72, 74 and 76 disposed on rear wall portion 26b of the housing 12. It is contemplated that the release button 43 is a spring biased release button, such that the release button 43 is a biased in a direction indicated by arrow C to an outward or engaged position. When a user wishes to remove the insert 40 from the housing 12, or adjust the vertical height of the insert 40, the user will press the release button 43 inwardly in a direction indicated by arrow D, such that a pawl member 80 moves in a direction as indicated by arrow E from an engaged position, as shown in FIG. 4, to an unengaged position. Thus, the pawl member 80 is mechanically coupled to the release button 43 and is also biased toward the engaged position in a direction as indicated by arrow C much like the release button 43. As shown in FIG. 4, the pawl member 80 is engaged with notch or detent 72. When the release button 43 is pressed, the pawl member 80 moves to the unengaged position in a direction as indicated by arrow E such that the 40 can be moved to either of the notches 74, 76 or removed from the housing 12 altogether. Further, as described above, the insert 40 can be moved vertically downward such that the second side 47 of the insert 40 is supported on the landing portions 27 of the housing 12. With the pawl member 80 biased towards an engaged position, the user need only press the release button 43 long enough to disengage the pawl member 80 with the corresponding notch or detent and allow the insert 40 to move downward until the pawl member 80 is aligned with the next vertically disposed notch or detent. When the pawl member 80 is so aligned, the biased pawl member 80 will automatically move to the engaged position to retain the insert 40 at the desired height level. The user may also keep the release button 43 in the unengaged position such that the insert 40 moves freely along the track member 60 of the housing 12.

Figure 5C:
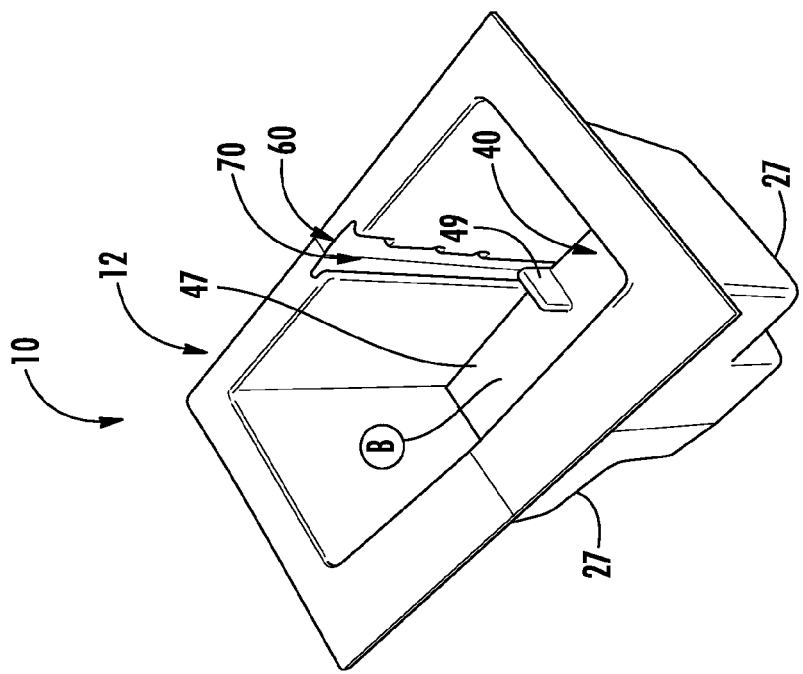
FIG. 5C is a perspective view of a user inverting the insert of the cup holder assembly.

Referring now to FIGS. 5A-5D, a user U is shown removing the insert 40 from the housing 12 and grasping the release button 43 as shown in FIG. 5A. Once the release button 43 is disengaged with the track member 60, the insert 40 can be removed as shown in FIG. 5B. As further shown in FIG. 5B, the rear most portion of the attachment feature 45 has a general T-shape configuration which is designed to compliment the cross-section of channel 70 of the track member 60. In this way, the attachment portion 45 of beverage storage and alignment feature 44 is adapted to be closely retained within channel 70 of the track member 60 as the insert 40 moves vertically along the housing 12.

Figure 5D:
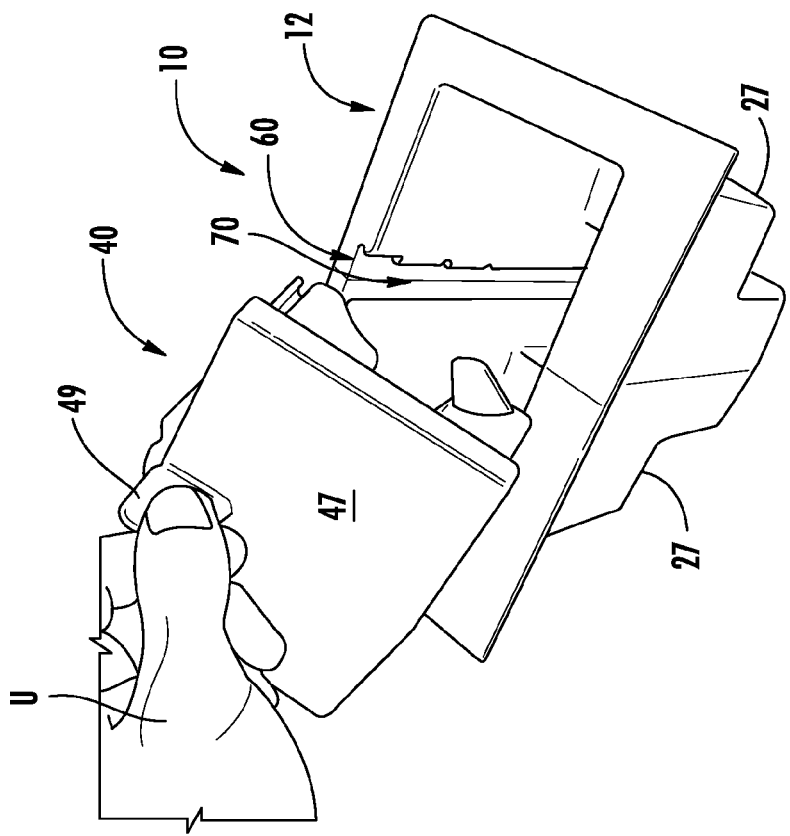
FIG. 5D is a perspective view of the insert as received in an inverted manner in the cup holder assembly.

Referring now to FIG. 5C, the user U has rotated or inverted the insert 40 such that second side 47 is upwardly disposed as the user grasps handle portion 49 of the insert 40. With reference to FIG. 5D, the user has now inserted the insert 40 into the housing 12 in the inverted position such that the second side 47 of the insert 40 is exposed to the user and supported on landing portions 27 of the housing 12.

Referring now to FIG. 6, a cross-section of the cup holder assembly 10 is shown as disposed within a console assembly 100. The console assembly 100 includes a gear shift mechanism 110 having a range of motion as indicated by arrow M. The console assembly 100 further includes an armrest 112, wherein the cup holder assembly 10 is disposed between the armrest 112 and the gear shifting mechanism 110. In the embodiment shown in FIG. 6, the insert 40 of the cup holder assembly 10 is disposed at a vertical position $V_1$ relative to the housing 12. In use, it is contemplated that a user may rest their forearm on the armrest portion 112 of the console assembly 100 while holding the handle 114 of the gear shift mechanism 110. When a large beverage, such as beverage 50 shown in FIG. 6, is stored in the cavity 30 of the cup holder assembly 10, a user may wish to move the insert 40 to a more downward position $V_2$, such that the upper portion of the beverage container 50 does not interfere with the user's access to the gear shifting mechanism 110. Further, a large beverage container may interfere with the range of motion M of the gear shift mechanism 110, for which a user may wish to move the insert 40 of the cup holder assembly 10 to the vertically downward position $V_2$, such that the range of motion M of the gear shift mechanism 110 is not impeded.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A cup holder assembly comprising:
a housing having a vertically extending track member;
an elongated channel vertically extending within the track member;
an alignment member extending within the channel and within the cup holder;
a reversible insert having first and second sides, the insert being vertically adjustable and removeably received in the channel of the track member; and the alignment member being mounted on the first side of the insert;
a plurality of detents vertically disposed along a flange on only one side of the track member and a flange without inserts on an opposite side of the track member;

wherein the alignment member of the insert is configured to be received on the track member within the housing in a first orientation, wherein the first side defines a cup holder floor; and wherein the insert is reversible in a second orientation, wherein the second side of the insert defines a cup holder floor, and wherein the detents disposed along the flange on only one side of the track member results in the insert being reversible due to the absence of detents on the flange without indents.

2. The cup holder assembly of claim 1, including:
a coupling mechanism disposed on the first side of the insert, the coupling mechanism having a pawl mechanism and a release button, wherein the pawl mechanism engages one of the plurality of detents to support the insert at varying vertical positions in response to the insert being in the first orientation.

3. The cup holder assembly of claim 2, wherein:
the release button disengages the pawl mechanism from one of the plurality of detents, providing vertical adjustment or removal of the insert from the housing.

4. The cup holder assembly of claim 3, wherein:
the alignment member comprises one or more alignment features.

5. The cup holder assembly of claim 4, wherein:
the coupling mechanism is disposed on one of the one or more alignment members.

6. The cup holder assembly of claim 3, wherein:
the insert moves freely along the track member in the second orientation.

7. A cup holder assembly comprising:
a storage bin having a vertically extending track member;
an alignment member extending within the housing;
a reversible insert vertically adjustable along the track member within the storage bin between upright and inverted positions; the alignment member being mounted on the upright position of the insert;
a plurality of detents vertically disposed along a flange on only one side of the track member and a flange without detents on an opposite side of the track member; wherein the alignment member of the insert includes one or more alignment members defining a first storage configuration in the upright position; and
wherein the insert is reversible into the inverted position defining a second storage configuration; wherein the detents disposed along the flange along only one side of the track member results in the insert and alignment member being reversible due to the absence of detents on the flange without detents.

8. The cup holder assembly of claim 7, wherein:
the storage bin is defined by:
a front wall,
a rear wall,
a lower well portion, and
side walls connecting the front wall and rear wall, the side walls having landing portions disposed above the lower well portion.

9. The cup holder assembly of claim 8, wherein:
the track member, elongated channel and alignment member are centrally disposed along the rear wall of the storage bin.

10. The cup holder assembly of claim 9, wherein:
the one or more alignment members are substantially disposed in the lower well portion when the insert is in the inverted position within the storage bin.

11. The cup holder assembly of claim 10, wherein:
the second side is a generally planar side having a handle portion extending therefrom.

12. The cup holder assembly of claim 11, including:
a coupling mechanism disposed on the first side of the insert, the coupling mechanism having a pawl mechanism and a release button, wherein the pawl mechanism engages one of the plurality of detents to support the insert at varying vertical positions in response to the insert being in the upright position.

13. A cup holder comprising:
a housing having a vertical track with opposing flanges and detents on one flange;
a reversible insert movable along the track and being operable between upright and inverted positions;
an alignment member on the upright position of the reversible insert and extending in both the track and the housing, wherein the insert and alignment member are reversible due to the absence of detents on the other flange.

14. The cup holder assembly of claim 13, including:
a coupling mechanism disposed on the alignment feature, the coupling mechanism having a pawl mechanism and a release button, wherein the pawl mechanism engages one of a plurality of detents disposed on the track, and supports the insert at varying vertical positions in response to the insert being in the upright position.

15. The cup holder assembly of claim 14, wherein:
the reversible insert includes a generally planar surface having a handle member extending outwardly from the inverted surface.

16. The cup holder assembly of claim 15, wherein:
the housing includes a lower well portion receiving the alignment feature in response to the insert being in the inverted position.

17. The cup holder assembly of claim 16, wherein:
the housing includes landing portions extending inwardly from side walls of the housing, wherein the landing portions abut and support the first side of the insert in response to the insert being in the inverted position.

18. The cup holder assembly of claim 17, wherein:
the insert moves freely along the vertical track in response to the insert being in the inverted position.

* * * * *